United States Patent
Sakthivelu et al.

(10) Patent No.: US 9,244,839 B2
(45) Date of Patent: Jan. 26, 2016

(54) METHODS AND APPARATUS FOR SUPPORTING PERSISTENT MEMORY

(71) Applicant: Intel Corporation, Santa Clara, CA (US)

(72) Inventors: Sridharan Sakthivelu, DuPont, WA (US); Robert Bruce Bahnsen, Boulder, CO (US); Gerrit Saylor, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 14/125,741

(22) PCT Filed: Jul. 26, 2013

(86) PCT No.: PCT/US2013/052390
§ 371 (c)(1),
(2) Date: Dec. 12, 2013

(87) PCT Pub. No.: WO2015/012871
PCT Pub. Date: Jan. 29, 2015

(65) Prior Publication Data
US 2015/0032972 A1    Jan. 29, 2015

(51) Int. Cl.
*G06F 12/08* (2006.01)
(52) U.S. Cl.
CPC .................................. *G06F 12/0804* (2013.01)
(58) Field of Classification Search
None
See application file for complete search history.

(56) References Cited

U.S. PATENT DOCUMENTS

| | | | |
|---|---|---|---|
| 6,052,789 | A | 4/2000 | Lin |
| 2002/0156983 | A1 | 10/2002 | Jones et al. |
| 2010/0106895 | A1 | 4/2010 | Condit et al. |
| 2013/0013860 | A1 | 1/2013 | Franceschini et al. |
| 2013/0086330 | A1 | 4/2013 | Baddepudi et al. |

OTHER PUBLICATIONS

CLFLUSH, "Cache Line Flush", May 8, 2013, 2 pages.
Addendum—Intel Architecture Software Developer's Manual, vol. 3: System Programming Guide, Order No. 243690-001, Copyright © Intel Corporation 1996, 1997, 20 pages.
"I/O: Connecting to Outside World, Chapter 8", Copyright © The McGraw-Hill Companies, Inc, 2013, pp. 1-12.
Integrated DeviceTechnology—89HF16P04AG3 16-Channel PCIe® x4 G3 Enterprise Flash Controller, 2012, 1 Page.

(Continued)

*Primary Examiner* — Kevin Verbrugge
(74) *Attorney, Agent, or Firm* — Barre Law Firm, PLLC

(57) ABSTRACT

A processing device features a processing unit, a memory management system, and persistent memory in a persistent memory domain. The processing device provides an enhanced write-back (WB-E) memory space for an application running on the processing unit. The memory management system maps the WB-E memory space to the persistent memory. The application creates WB-E data by executing an instruction to store data to an address in the WB-E memory space. The WB-E data is automatically stored in a cache associated with the processing unit in response to creation of the WB-E data by the application. In response to execution of a commit instruction by the application after the application has created WB-E data for multiple memory addresses, the memory management system automatically ensures that all of the WB-E data for the application has been saved to the persistent memory domain. Other embodiments are described and claimed.

27 Claims, 8 Drawing Sheets

(56) References Cited

OTHER PUBLICATIONS

Intel® I/O Controller Hub 8/9 LAN NVM Map and Information Guide, Apr. 2012, Revision 2.6, pp. 1-28.
TMS320C621x/C671x DSP Two-Level Internal Memory Reference Guide, Literature No. SPRU609B, Jun. 2004, pp. 1-66.
Condit, et al., "Better I/O Through Byte-Addressable, Persistent Memory", SOSP'09, Oct. 11-14, 2009, 14 pages.
Doshi, et al., "WrAP: Managing Byte-Addressable Persistent Memory", MEAOW'12, Oct. 11, 2012, 6 pages.
Åkesson, Benny, "An introduction to SDRAM and memory controllers", 2013, pp. 1-30.
International Search Report and Written Opinion received for PCT Patent Application No. PCT/US2013/052390, mailed on Apr. 23, 2014, 9 pages.

METHODS AND APPARATUS FOR SUPPORTING PERSISTENT MEMORY

CROSS REFERENCE TO RELATED APPLICATIONS

This application is a national stage application under 35 U.S.C. §371 of international application serial no. PCT/US2013/052390, entitled "METHODS AND APPARATUS FOR SUPPORTING PERSISTENT MEMORY," filed on Jul. 26, 2013.

TECHNICAL FIELD

Embodiments described herein generally relate to data processing and in particular to methods and apparatus for supporting persistent memory.

BACKGROUND

A conventional data processing device may use both volatile and non-volatile data storage devices. For instance, the data processing device may use a hard disk drive as a non-volatile mass storage device, while using random access memory (RAM) as a volatile storage device. The data processing device may also use non-volatile flash memory. Volatile storage may also be referred to as non-persistent storage. Conversely, non-volatile storage may also be referred to as persistent storage. Persistent storage maintains its contents even when not powered, while non-persistent storage does not reliably maintain its contents when not powered.

Typically, persistent mass data storage devices (e.g., hard disk drives) are file addressable, while non-persistent data storage devices (e.g., RAM) are location addressable or byte addressable. However, persistent storage devices may also be location addressable or byte addressable. For instance, the boot code for a data processing device may reside on flash memory that is byte addressable.

For purposes of this disclosure, the term "persistent memory" refers to data storage that is location addressable or byte addressable and that retains its contents even when not powered.

A data processing device may use one or more caches for improved performance. For instance, a central processing unit (CPU) may include one or more levels of cache. Similarly, memory controllers and other components may include data buffers.

In addition, a data processing device may be configured to use different techniques for storing data in different memory spaces. For instance, some or all of the addressable memory space may be configured to operate as write-back (WB) memory. When an application, an operating system, or other software stores data to WB memory, the data actually gets saved first in cache, and the data is then written into the ultimate memory location only under certain conditions or at predetermined intervals. When new data has been written to cache but not to the corresponding location in memory, the data in the cache is considered fresh, and the old data in memory is considered stale. In addition, the cache line that contains the fresh data is considered dirty.

When an operating system or an application stores or writes data to a specified location in persistent memory, there may be a significant delay between when the store instruction or operation is considered complete and when the data is actually stored in the persistent memory. Consequently, if power is lost after an application has executed a store instruction but before the corresponding data has reached the persistent memory domain, erroneous results may occur. For purposes of this disclosure, the term "persistent memory domain" refers to the hardware component (or collection of components) which guarantees that received data will be saved in persistent memory, even if power is lost after the data reaches that (those) hardware component(s). In addition, the term "PM software" refers to application software that stores data to persistent memory, an operating system that stores data to persistent memory, or other types of software that store data to persistent memory. Also, the term "durable" may be used to refer to data that has reached the persistent memory domain.

If a software developer uses great care and pays very close attention to many details, it may be possible for the developer to design PM software which addresses the risks of power loss and erroneous results. But, as described in greater detail below, addressing those risks at the application software level is probably not the best way to address those risks. Software developers could use improved methods and apparatus for supporting persistent memory.

DESCRIPTION OF EMBODIMENTS

In a conventional cache-coherent, byte addressable, persistent memory system, software needs to take extra precautions for writes which require durability because posted writes to WB memory complete before they reach the persistent memory domain. For purposes of this disclosure, a "posted write" is a write that is considered complete before the data to be written actually reaches the ultimate storage destination. Posted write data could be sitting in a processing unit, somewhere within a cache hierarchy, or in a memory controller, for example. And if power failure occurs, the data may be lost without reaching durability in the persistent memory domain. Consequently, software must ensure that write content reaches the persistent memory domain before the software considers an atomic, consistent, isolated, and durable (ACID) transaction to be complete. For example, application software which issues random writes (e.g., an online transaction processing (OLTP) application) may need to block further execution of the application until each write is flushed out to make sure the data has reached the persistent memory domain before the software can proceed to next step. Alternatively, as described in greater detail below, to ensure that a committed transaction is durable, it may be necessary for the software performing that transaction (a) to keep track of all of the memory addresses which are affected by the transaction, and (b) to explicitly flush each of those addresses (at cache line granularity) out of the cache.

An improved method and apparatus for supporting persistent memory enables software to ensure that a committed transaction is durable without requiring the software to keep track of all of the memory addresses which are affected by the transaction, and without requiring the software to explicitly flush each of those addresses out of the cache at cache line granularity.

Figure 1:
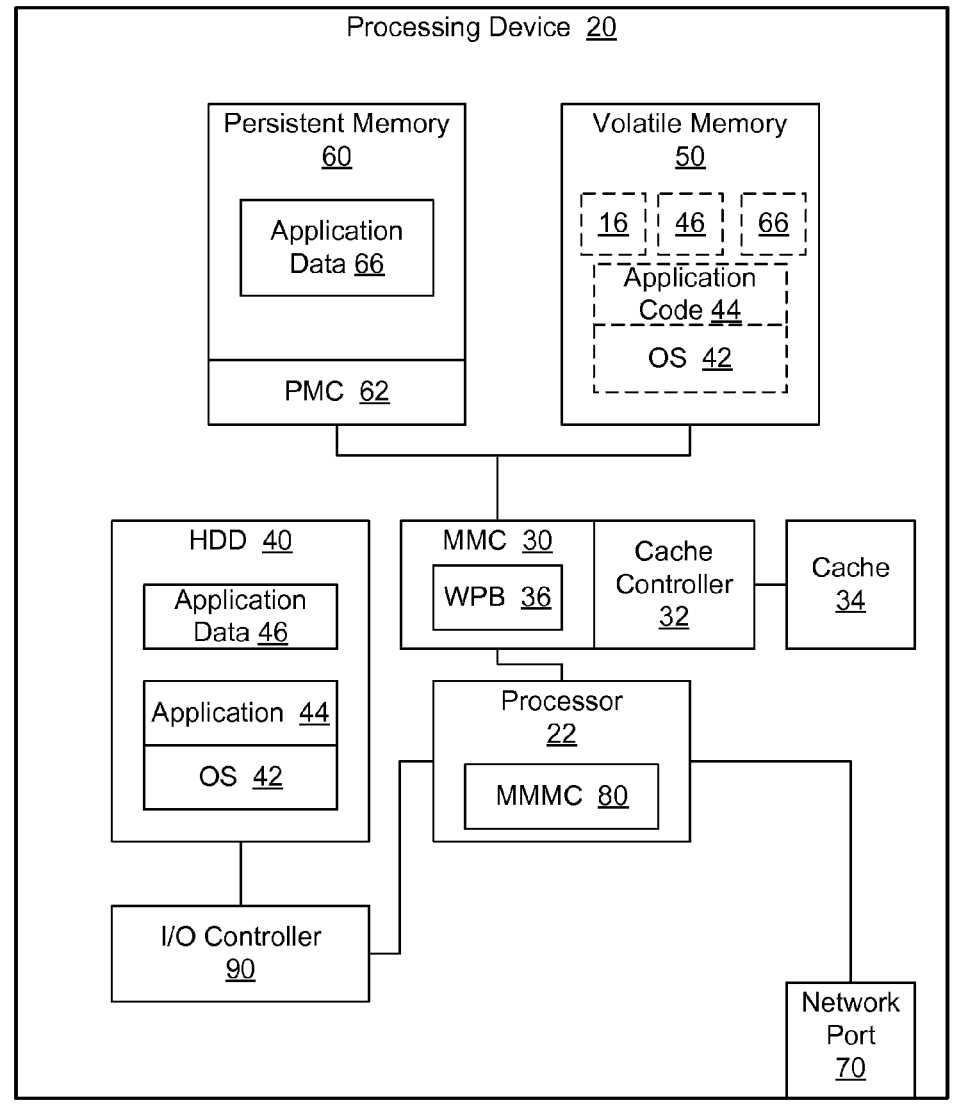
FIG. 1 is a block diagram of an example data processing system with features for supporting persistent memory.
Figure 1:
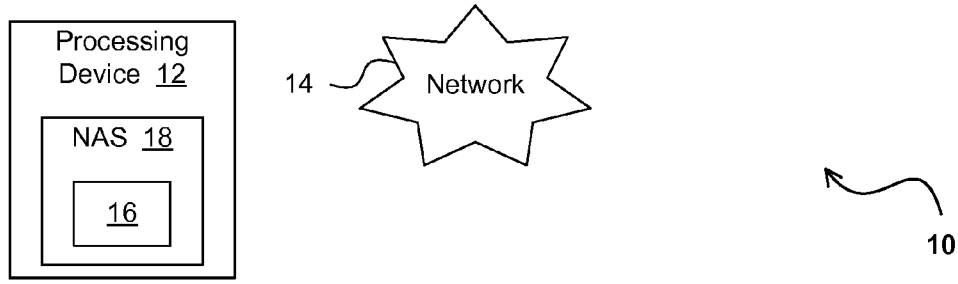

FIG. 1 is a block diagram of an example data processing system 10 with features for supporting persistent memory. As used herein, the terms "processing system" and "data processing system" are intended to broadly encompass a single machine, or a system of communicatively coupled machines or devices operating together. For instance, two or more machines may cooperate using one or more variations on a peer-to-peer model, a client/server model, or a cloud computing model to provide some or all of the functionality described herein.

In the embodiment of FIG. 1, data processing system 10 includes a local processing device 20 and a remote processing device 12. In the embodiment of FIG. 1, remote processing device 12 provides network-attached storage (NAS) 18 for other devices, such as local processing device 20. Any suitable types of processing devices may be used for local processing device 20 and remote processing device 12. In some embodiments, the remote processing device may be omitted. In the embodiment of FIG. 1, the processing devices in processing system 10 connect to or communicate with each other via one or more networks 14. The networks may include local area networks (LANs) and/or wide area networks (WANs) (e.g., the Internet). For purposes of this Detailed Description, local processing device 20 may also be referred to simply as "processing device 20."

In the embodiment of FIG. 1, processing device 20 features at least one central processing unit (CPU) or processor 22, along with volatile random access memory (RAM) 50, persistent memory (PM) 60, a network port 70, and one or more nonvolatile mass data storage devices such as a hard disk drive (HDD) 40. RAM 50, PM 60, and port 70 may be responsive to or coupled to processor 22. HDD 40 may be coupled to processor 22 via an I/O controller 90. Additional input/output (I/O) components (e.g., a keyboard, a display, etc.) may also be responsive to or coupled to processor 22. Processor 22 may include one or more processor cores. A processor core may also be referred to as a processing unit or a processing element.

In the embodiment of FIG. 1. HDD 40 contains an operating system (OS) 42 and an application 44. Application 44 may also be referred to as application code. Processing device 20 may copy OS 42 and application 44 into RAM 50 for execution. Application 44 may also work with data in RAM 50, and application 44 may save different types or categories of data to different nonvolatile media for retention. In the embodiment of FIG. 1, application 44 is designed to save application data 66 to persistent memory 60. Accordingly, application 44 may also be referred to as PM software. Application 44 may also save data to other local and/or remote storage devices. For example, application 44 may save application data 46 in HDD 40 and application data 16 in NAS 18.

In the embodiment of FIG. 1, the memory architecture of processing device 20 includes a main memory controller (MMC) 30, a cache controller 32, and at least one level of processor cache 34. In the embodiment of FIG. 1, MMC 30, cache controller 32, and cache 34 are directly or indirectly coupled to processor 22. In alternatively embodiments, one, some, or all of the MMC, the cache controller, and the cache may be integrated with the processor. In the embodiment of FIG. 1, the memory architecture also includes volatile memory 50, persistent memory 60, and a persistent memory controller (PMC) 62. In the embodiment of FIG. 1, the PMC 62 is integrated or packaged with the persistent memory. In alternative embodiments, some or all of the PMC may be integrated or packaged with other components (e.g., with the MMC and/or with a processor core). In the embodiment of FIG. 1, once PM data has reached PMC 62, it has reached the persistent memory domain.

MMCs and PMCs may also include caches or buffers. For instance, in the embodiment of FIG. 1, MMC 30 features a write-pending buffer (WPB) 36.

The memory architecture also includes control logic for controlling and coordinating the activities of the various components of the memory architecture. In the embodiment of FIG. 1, the memory management control logic is implemented as memory management microcode (MMMC) 80, and some or all of MMMC 80 is stored in processor 22. In alternative embodiments, some or all of the memory management control logic may reside in other components (e.g., in the MMC). In addition or alternatively, some or all of the memory management control logic may be implemented as firmware, as one or more state machines, as hardwired logic, and/or as any other suitable type of control logic. For purposes of this disclosure, the memory management control logic and the associated hardware components may be referred to collectively as the memory management system (MMS).

Some or all of the components of the memory architecture may be configured to operate as a cache coherency domain. For instance, the cache coherency domain may include processor 22, MMC 30. RAM 50, and persistent memory 60. In another embodiment, the cache coherency domain may also include the persistent memory controller.

Also, a processing device may provide different kinds of resources at different levels of abstraction. For instance, the hardware and some or all of the firmware may be referred to collectively as a platform. An operating system may run on top of that platform to establish a higher level of abstraction referred to as a system level. In addition, applications may run on top of the operating system at an application level.

The platform may provide various instructions for durable writes. Those instructions may include the following:

CLFLUSH (cache line flush): Invalidates the cache line that contains the linear address specified with the source operand from all levels of the cache hierarchy. The invalidation is broadcast throughout the cache coherence domain. If, at any level of the cache hierarchy, the line is inconsistent with memory (dirty), the line is written to memory before invalidation. This is an unordered instruction.

CLWB (cache line write-back): Writes back the cache line (if dirty) that contains the linear address specified with the memory operand from any level of the cache hierarchy in the cache coherence domain, without invalidating the cache line. This is an unordered instruction.

CMTPM (commit to persistent memory): Causes certain store-to-memory operations to PM to become durable or persistent (i.e., protected from power failure). For instance, CMTPM may evict all pending PM writes from the WPB of the MMC. Thus, CMTPM may ensure that data which has been written to the MMC is also written to the persistent memory domain.

The instructions in the memory architecture may also include one or more serializing or "fence" instructions, such as SFENCE (store fence) and MFENCE (memory fence). SFENCE guarantees that the data for every store instruction that precedes in program order the SFENCE instruction is globally visible before any store instruction that follows the SFENCE instruction. For instance, SFENCE may cause data to be written from the cache of a processing unit to the write buffer in a memory controller. MFENCE may work like SFENCE, but also making data for load instructions globally visible. When an application executes a serializing instruction, control does not return to the application until the serialization instruction has finished its work. Thus, serializing instructions are blocking instructions.

However, in some embodiments, even with the instructions described above, software which issues random writes may still need to (a) keep track of all writes to PM, (b) issue CLFLUSH or CLWB in batch for each of the updated PM locations, and (c) use CMTPM to ensure that all writes have reached the PM domain before the software can consider a transaction complete.

For instance, if the application has written data to ten different WB memory locations as part of a single logical transaction, the application may need to record all ten "write" addresses. And when the application has determined that the transaction is ready to be finalized, the application may need to execute one CLFLUSH instruction for each of those addresses, to cause the corresponding dirty cache lines to be flushed to the memory controller. The application may then need to execute a serializing or fence instruction to make sure that the CLFLUSH instructions are executed before any succeeding instructions. The application may then need to execute CMTPM to make sure that all of the data that was flushed to the main memory controller has also been written to the persistent memory domain. The application may then need to execute a final serializing instruction to make sure the CMTPM has finished writing the data to the persistent memory domain. After the final serializing instruction is complete, the application may then consider the transaction to be complete.

Keeping track of all memory writes is a very unusual requirement for most software developers. Extra bookkeeping and very careful and skilled design is required. And if the software does not track and handle memory writes properly, the software is likely to suffer from errors that are hard to detect and that can cause catastrophic data loss. Thus, the approach described above creates a fragile situation. For instance, the programmer might have accidently neglected to make sure that one or more lines of the transaction gets flushed. In that case, the software may appear to be operating correctly, until one day a power failure occurs at the right spot and exposes the latent bug in the code. In addition, limited control of external decisions may cause additional programming difficulties. For instance, a data structure to be saved in persistent memory may be defined in one program to fit within a single cache line, but that data structure may be redefined elsewhere to span multiple lines. Accordingly, this kind of programming model is not well suited for enterprise class software, where the consequences of potential errors can be very bad.

However, the embodiment of FIG. 1 involves methods and apparatus for reducing or eliminating the risk of such errors. This embodiment introduces a new memory type that eliminates the need for application software to keep track of all PM writes. This new memory type may also eliminate the need for application software to explicitly execute cache flushing or write-back instructions such as CLFLUSH or CLWB. This new memory type may also eliminate the need for application software to explicitly perform serializing operations such as SFENCE or MFENCE. For purposes of this document, this new memory type is referred to as "enhanced write-back" memory or "WB-E" memory. And data that is being (or has been) written to WB-E memory may be referred to as "WB-E data." More generally, data that has been written to any type of persistent memory may be referred to as "PM data."

In some embodiments, the MMS may also opportunistically write PM data from the cache to a memory controller. In addition or alternatively, the MMS may opportunistically write PM data from the memory controller to the persistent memory domain. Accordingly, the enhanced write-back memory may also be referred to as "eager write-back" memory. For purposes of this document, unless specified otherwise or clearly required by the context, the term "WB-E" refers to both eager write-back memory and enhanced write-back memory.

In one embodiment, WB-E memory operates like WB memory in some respects. For instance, writes to and reads from WB-E memory are cached. Reads come from cache lines on cache hits. Read misses cause cache fills. Speculative reads are allowed. Write misses cause cache line fills. Write combining may also be allowed, depending on underlying implementation.

However, as described in greater detail below, in one embodiment, the MMS performs writes entirely in the cache, and the MMS marks or tracks those writes for "eager" write back at a later time. In other words, the MMS automatically tracks writes to WB-E memory, to provide for automatic and/or "eager" write-back of the PM data to the persistent memory domain at a later time. The MMS may automatically schedule write backs at appropriate times, as dictated by the implementation. In addition, the MMS enables PM software to use one or more serializing instructions to ensure that all PM data has been completely written back to the persistent memory domain.

This type of cache-control may be appropriate for PM usage or other usage where high performance write-through properties are required or desired, but non-blocking writes are needed. In one embodiment, the MMS enforces coherency through a snoop protocol. Memory regions with the type WB-E can be thought of as WB memory with eager write-back and without the need for explicit CLFLUSH or CLWB operations.

When using WB-E memory, the PM software need not keep track of the locations of all memory writes, because the MMS will automatically track the PM writes, enabling the PM software to ensure durability of the PM data by using one or more serializing instructions. For instance once an application completes all of its PM writes for a transaction, to make sure the data reaches the PM domain, the application may simply issue instructions such as SFENCE and CMTPM. Consequently, this model is more natural for today's applications, compared to requiring the application to keep track of all PM writes, to flush particular cache lines, to wait for the flushes to complete, and to wait for a durability guarantee. In addition, the MMS may eagerly write back all of the software's writes in an efficient way.

In one embodiment, the MMS includes support for the WB-E memory type, in addition to other memory types, such as WB, write-combining (WC), write-through (WT), write-protect (WP), and uncached (UC). In one embodiment, to support WB-E memory, the MMS extends the memory type encoding in the memory type range registers (MTRRs), the page attribute table (PAT), the page table, the advanced configuration and power interface (ACPI) tables, etc.

Figure 2:
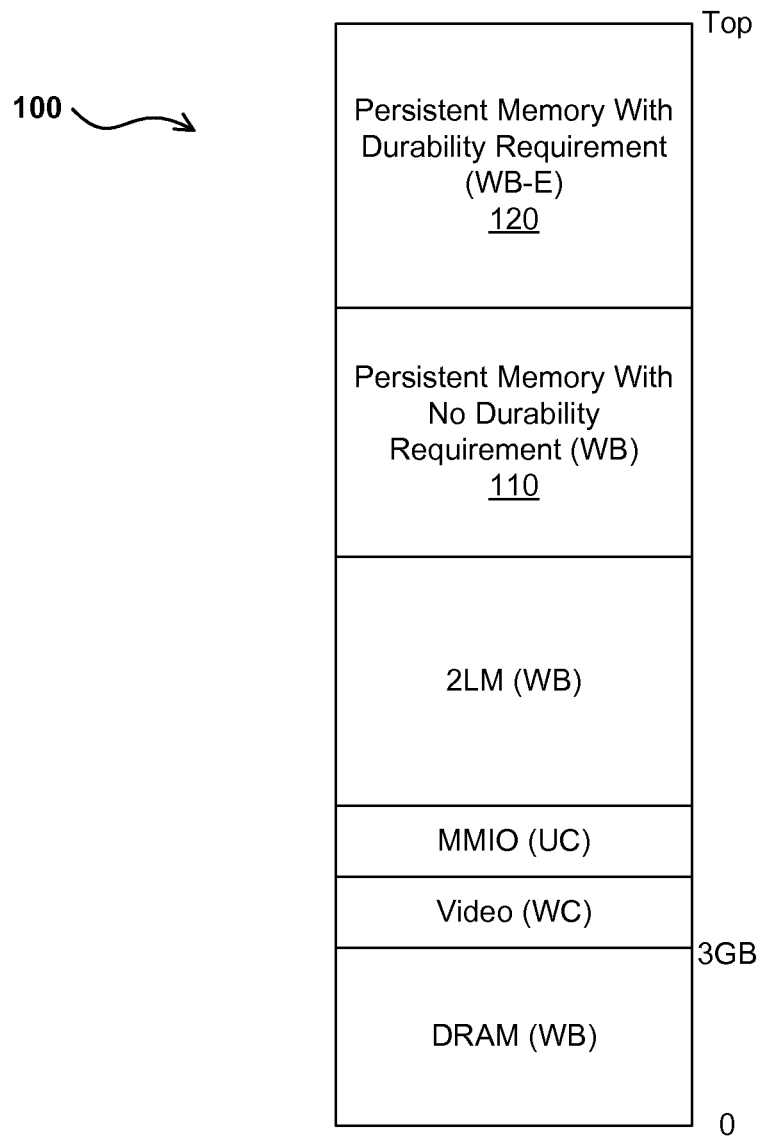
FIG. 2 is a block diagram showing an example collection of memory spaces.

FIG. 2 is a block diagram showing an example collection of memory spaces residing at different portions of a virtual address space 100. Virtual address space 100 is provided in processing device 20 by OS 42, with support from the MMS. In the embodiment of FIG. 2, virtual address space 100 includes a three gigabyte (GB) block of addresses, starting at memory address 0, mapped to dynamic RAM (DRAM) with the WB memory type. OS 42 maps another block of virtual addresses to a video controller with the memory type WC. OS 42 maps another block of virtual addresses to memory-mapped I/O (MMIO) with the memory type UC. OS 42 maps another block of virtual addresses to second level volatile memory (2LM) with the memory type WB. As shown at block 110, OS 42 maps another block of virtual addresses to persistent memory, for data with no durability requirement, with the memory type WB.

And as indicated at block 120, OS 42 maps another block of virtual addresses to persistent memory, for data with durability requirements, with the memory type WB-E. That block of virtual addresses may be referred to as "the WB-E memory space" or simply as "WB-E memory." In the embodiment of FIG. 2, OS 42 (with support from the MMS) maps the WB-E memory space to physical addresses in PM 26 that cover the same amount of space. In another scenario or embodiment, the PM capacity could be four terabytes, and the WB-E memory could occupy all four terabytes, with the WB-E memory starting at the two terabyte (TB) memory address. However, in other scenarios, configurations, or embodiments, the WB-E memory may have different sizes, different starting addresses, and different ending addresses.

Figure 3:
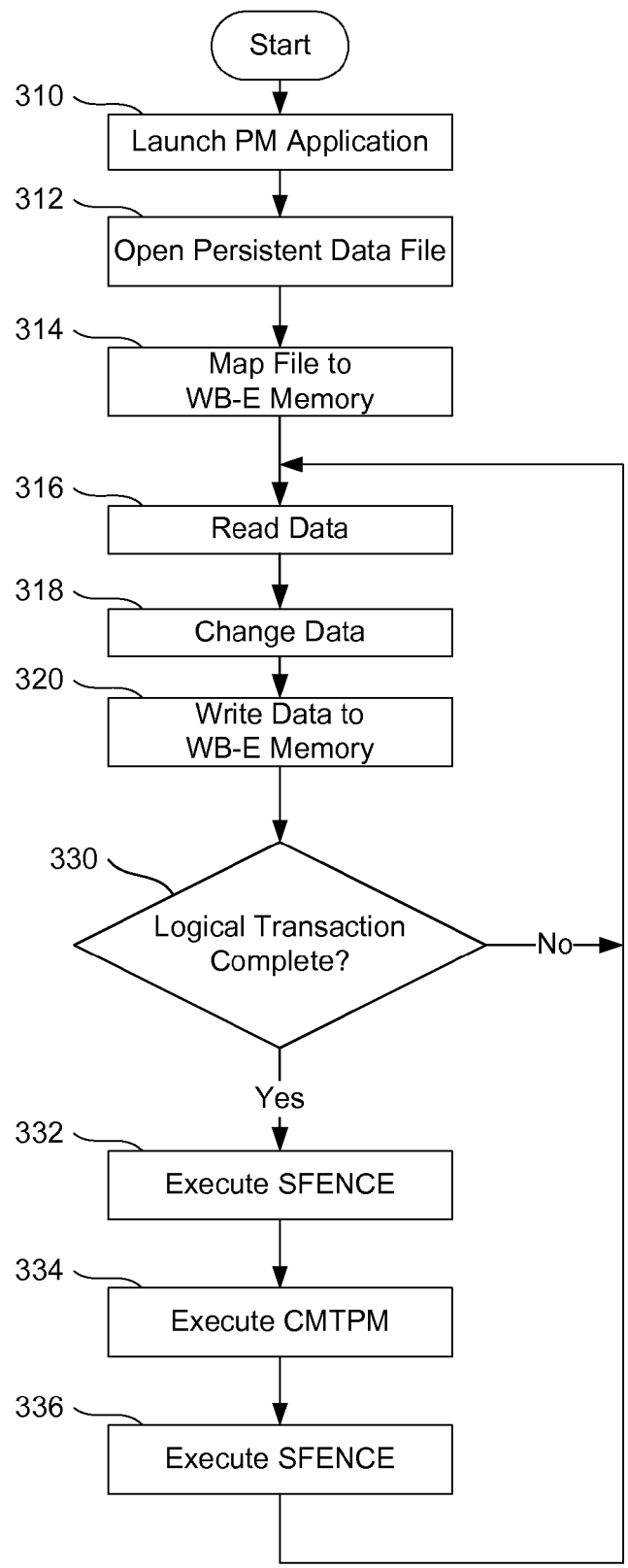
FIG. 3 is a flowchart of an example process for using persistent memory.

FIG. 3 is a flowchart of an example process for using persistent memory. The illustrated process starts with application 44 being launched, as shown at block 310. Application 44 may then open a file containing persistent application data, as shown at block 312. For instance, application 44 may open the file shown in FIG. 1 as application data 66. As illustrated at block 314, application 44 may then map application data 66 into the WB-E memory space. Application data 66 may also be referred to as the PM data file.

The operating system may provide application 44 with access to WB-E memory. In one embodiment, the operating system may always expose all of the PM with the WB-E memory type. In another embodiment, the operating system may always expose only a portion of the PM with the WB-E memory type, possibly exposing another portion of the PM for use as standard volatile memory in WB mode. In another embodiment, the operating system may be configurable to expose either some of the PM or all the PM with the WB-E memory type, depending on circumstances. The operating systems in each of those different embodiments may provide different sets of application programming interfaces (APIs) which applications may use to access WB-E memory. For example, OS 42 can include APIs that are extensions or variations on conventional IOCTL_DISK_CREATE_XXX, IOCTL_DISK_SET_XXX, and IOCTL_DISK_GET_XXX interfaces, where the new interfaces enable applications to create and query PM partitions.

An OLTP application may not require all writes to be durable across the boot/power cycle. For instance, the application may not require TEMP DB writes to be durable. So the application can improve performance by not spending time for such writes with guaranteed durable semantics. In such a use case, the application may choose not to apply the WB-E property on the portion or partition of the PM to be used for TEMP DB writes.

Referring again to FIG. 3, at block 314 application 44 may use an API provided by OS 42 to map the PM data file into WB-E memory space 120, for instance. For example, application 44 may use an API like OpenFile( ) to open an existing file or a new file on the persistent-memory-based disk/volume, and application 44 may map that file to the application's address space using an API like CreateFileMapping( ) and/or MapViewOfFile( ).

As shown at block 316, application 44 may then use addresses within WB-E memory space 120 to read data from the PM data file. In other words, application 44 may use addresses within WB-E backed virtual memory. As shown at blocks 318 and 320, application 44 may also manipulate or modify that data and execute instructions to store the modified data back to the PM data file. However, as described in greater detail below with regard to FIGS. 4A and 4B, from the perspective of application 44, those writes may seem to be completed even though the written data may not yet have actually reached the persistent memory domain.

As shown at block 330, application 44 may then determine whether it has completed all of the processing required for a logical transaction. If not, additional reading, manipulating, and writing may be performed, as described above with regard to blocks 316, 318, and 320.

However, if a logical transaction is complete, application 44 may execute a serializing instruction (e.g., SFENCE), as shown at block 332, to make sure that all of the PM writes have finished writing the PM data to cache 34. As shown at block 334, application 44 may then execute a commit instruction (e.g., CMTPM), to cause the MMS to write, to the persistent memory domain, any PM data that might still be in the WPB of MMC 30.

However, in the embodiment of FIG. 3, the commit instruction is not a serializing instruction. Consequently, as shown at block 336, application 44 may then execute another serializing instruction (e.g., SFENCE), to make sure that the commit instructions has finished all of its activity before the application does any further processing. Once control returns to application 44, application 44 may continue processing the PM data with additional transactions, as indicated by the arrow leading from block 336 to block 316.

Figure 4A:
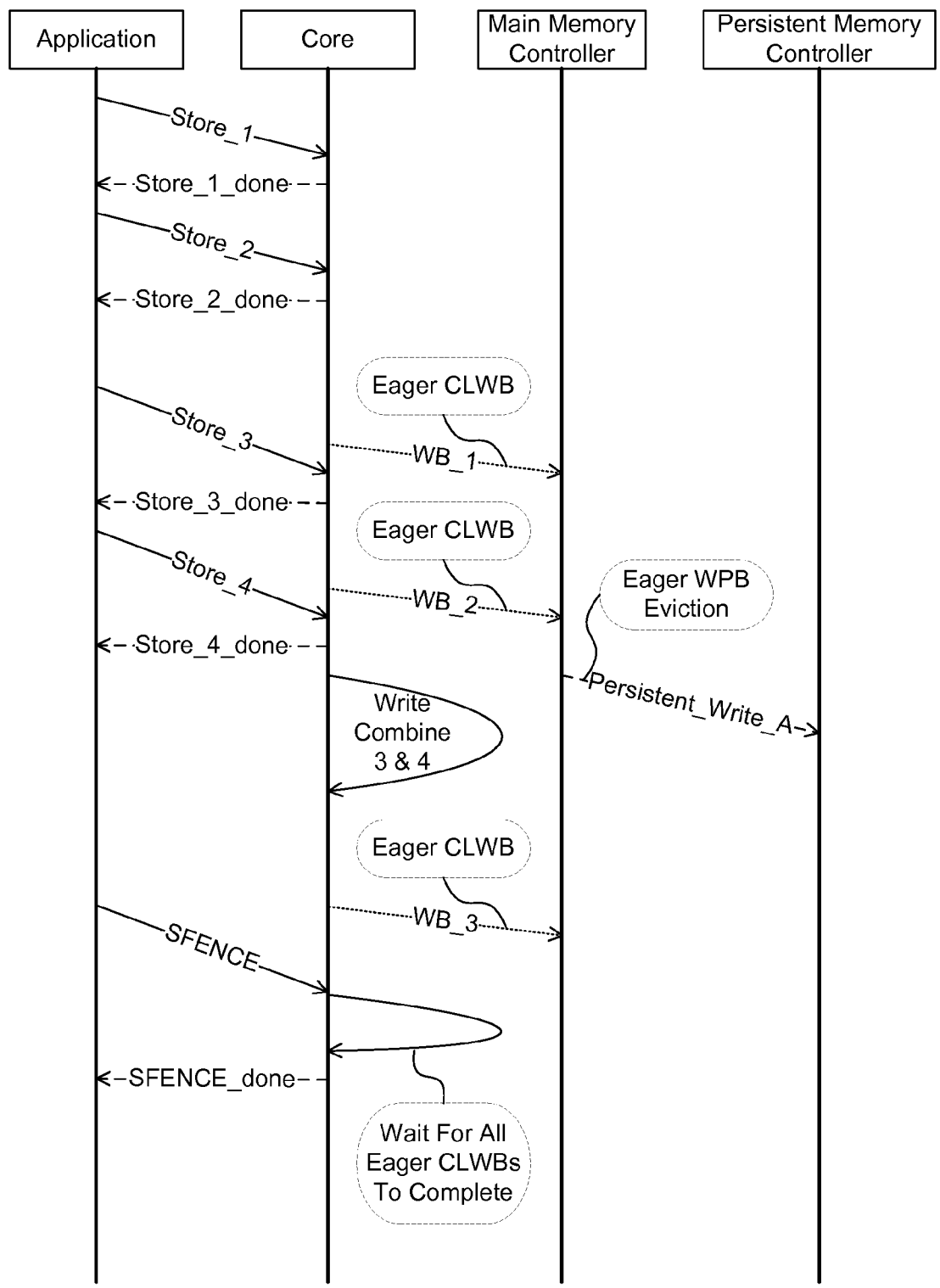
FIGS. 4A and 4B present a sequence diagram depicting an example sequence of operations for supporting persistent memory.
Figure 4B:
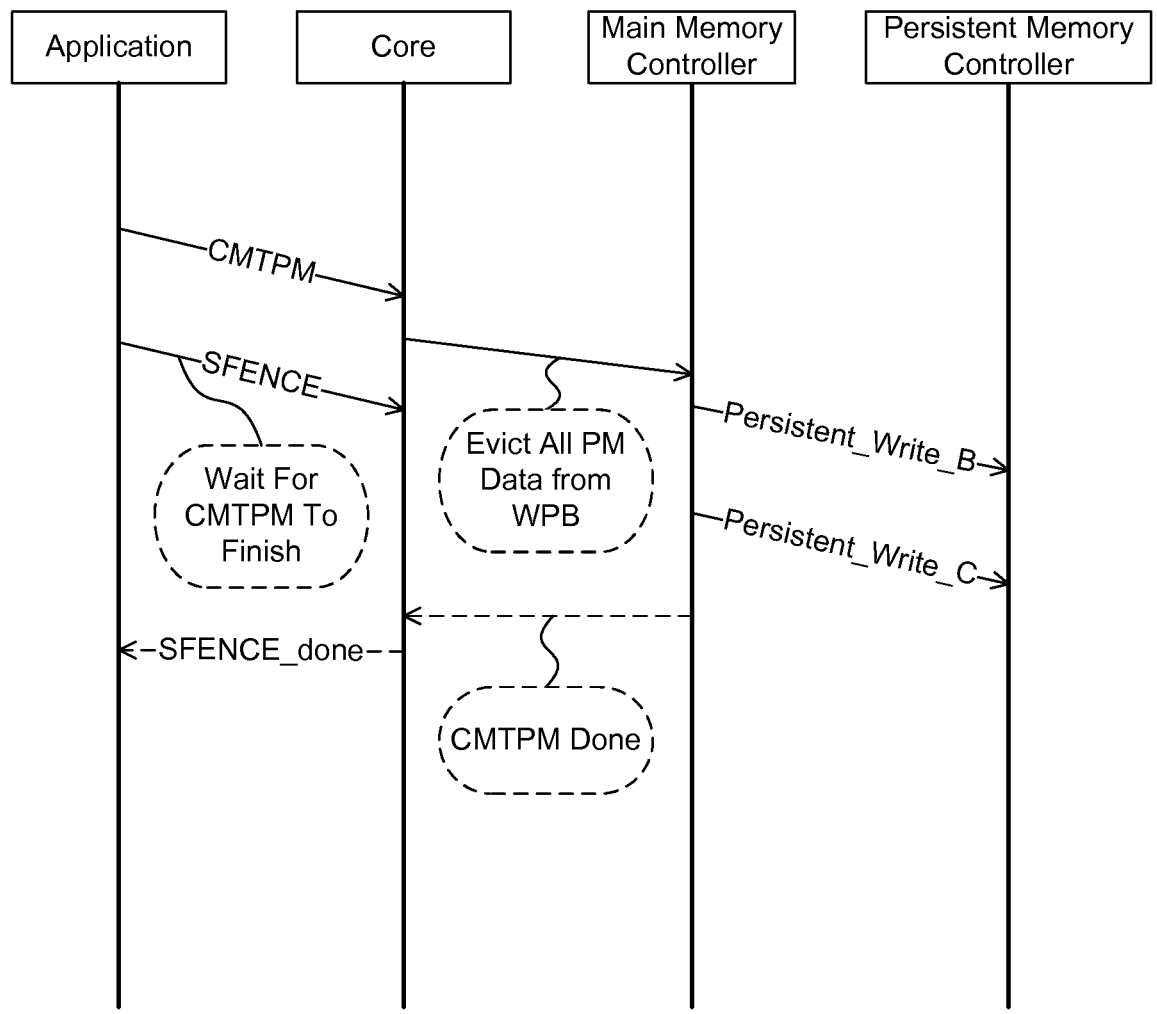

FIGS. 4A and 4B present a sequence diagram depicting an example sequence of operations for supporting persistent memory. Four columns are used to show how different components cooperate to complete the operations shown. Those columns are labeled as follows: Application, Core, Main Memory Controller (or "MMC"), and Persistent Memory Controller (or "PMC"). The illustrated sequence highlights an example of the kinds of operations that the MMS might perform in response to the operations of application 44 described with regard to FIG. 3. For instance, in FIG. 4A, four store instructions from application 44 addressing WB-E memory are shown as four arrows leading from the Application column to the Core column, with those arrows labeled as follows: Store_1, Store_2, Store_3, and Store_4. And the dotted lines returning to the Application column from the Core column show that application 44 may consider the store instructions to be complete (or "done"), even though the PM data that is being stored has only made it to the processor cache.

In FIG. 4A, the three arrows leading from the Core column to the MMC column illustrate eager write backs by the MMS, as described in greater detail below.

Figure 5A:
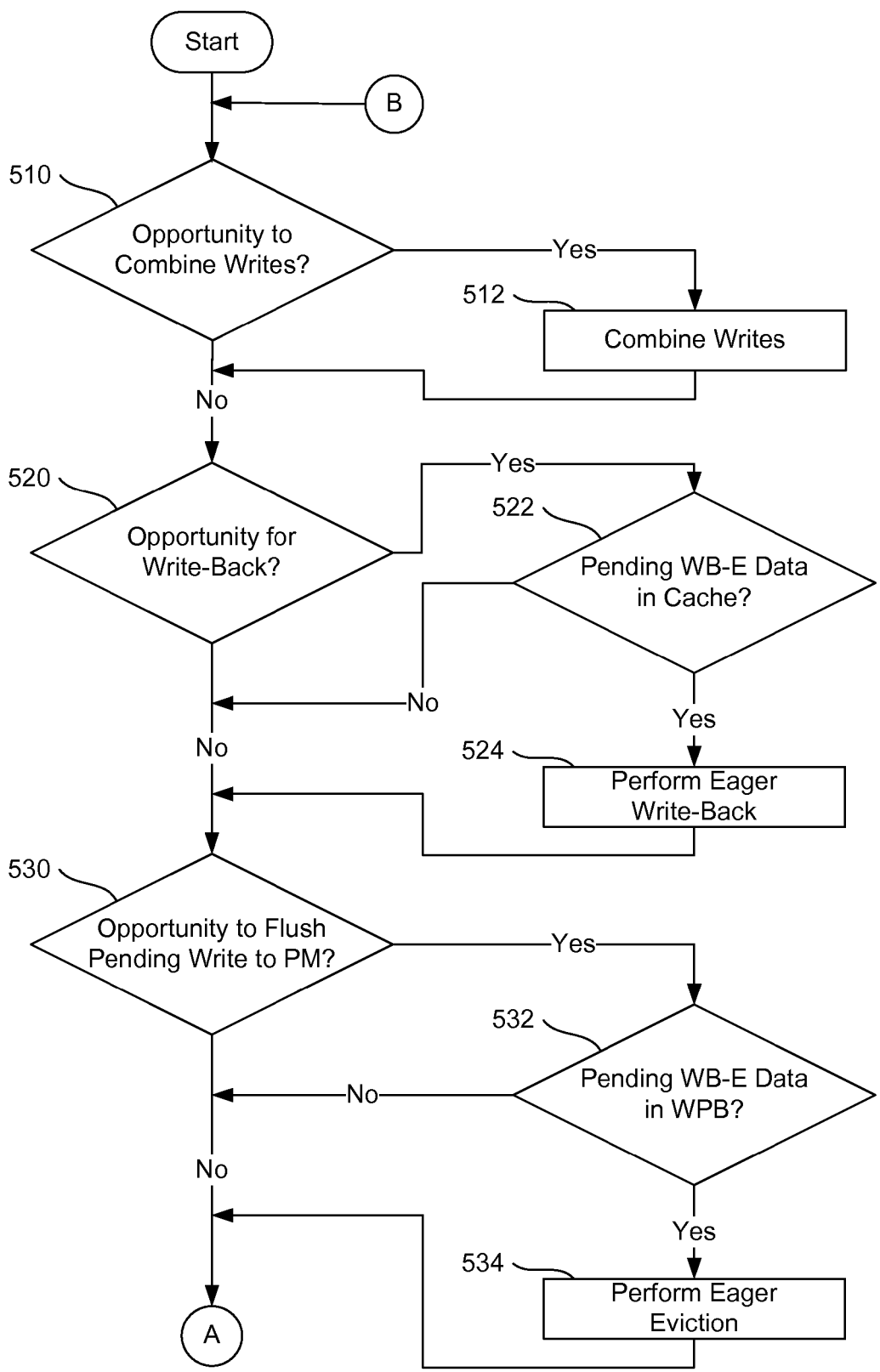
FIGS. 5A and 5B present a flowchart of an example process for supporting persistent memory.
Figure 5B:
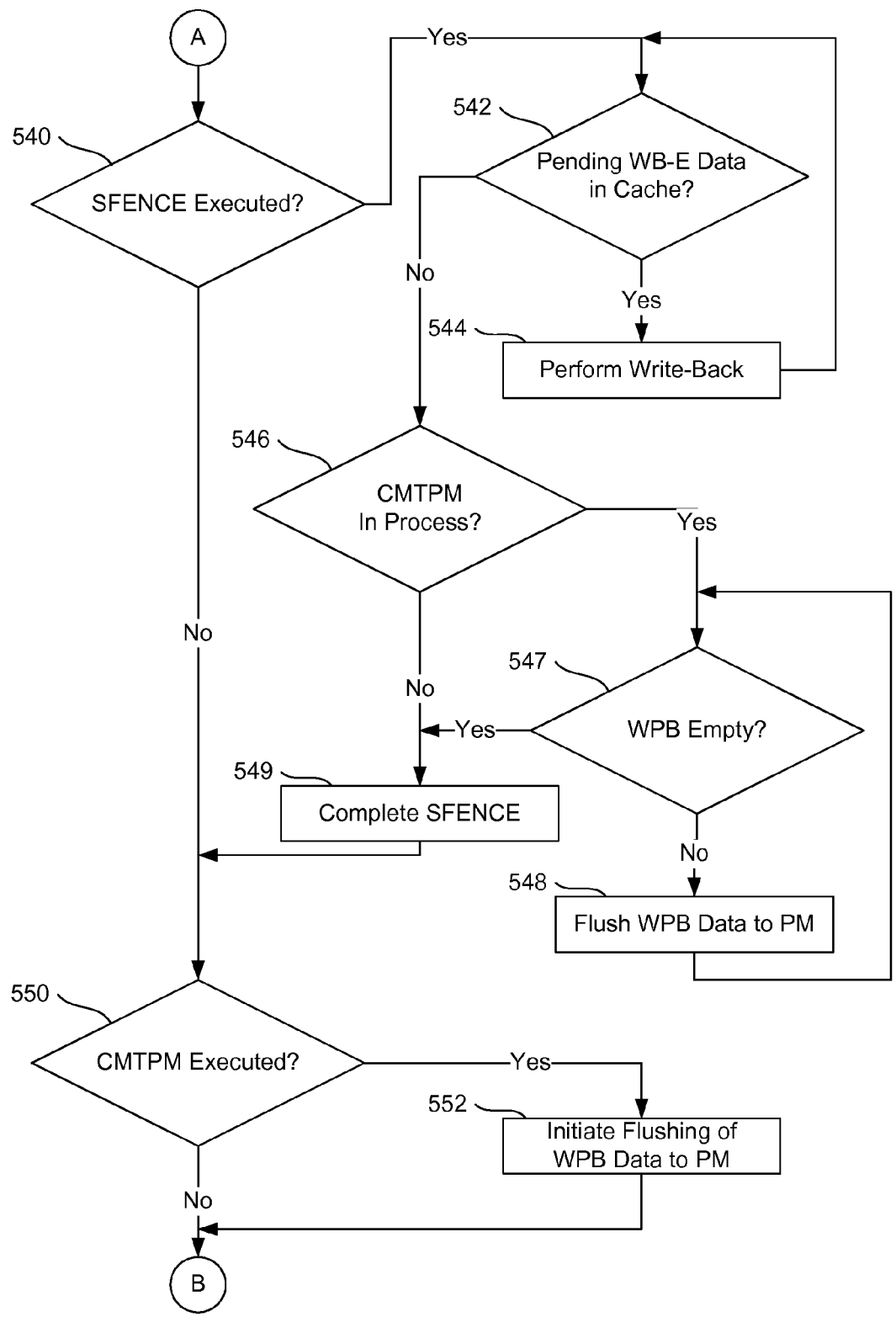

FIGS. 5A and 5B present a flowchart of an example process for supporting persistent memory. Some or all of the operation shown in FIGS. 5A and 5B may be performed by the MMS. The illustrated operations start at block 510 with the MMS automatically determining whether recent operations have resulted in a good opportunity to perform write combining. For instance, the MMS may determine that write combining should be done in response to detecting that two write or store instructions will update the same cache line. In response to a positive determination, the MMS may perform write combining, as shown at block 512. For instance, referring again to FIG. 4A, after application 44 has performed Store_3 and Store_4, if both of those operation update the same cache line, the MMS may determine that those two operations should be merged into a single write-combine operation that performs a single write. Consequently, the MMS automatically issues just one optimized flush or write-back operation, shown as "WB_3." In addition or alternatively, depending on the implementation or configuration, the MMS may optimize performance by performing writes from cache lines without invalidating those cache lines. Such an optimization may be beneficial in a scenario where there is reuse of recently written data.

The control logic for write-combining optimization may reside in a micro-engine for processor 22, in a micro-engine for cache controller 32, and/or in microcode (or other control logic) in other components.

The process in FIG. 5A may then pass to block 520, with the MMS automatically determining whether or not the current state of processing device 20 presents a good opportunity to perform an eager write back to the MMC. For instance, the MMS may determine whether the resources needed to write data from cache 34 to MMC 30 are available. In one embodiment, the MMS makes such a determination whenever a write is allowable and/or whenever read/write bandwidth or utilization falls below a certain threshold. For instance, to eliminate latency concerns, write credits may be used to track the number of outstanding writes, so as to not overwhelm the concurrent write capabilities or buffering capacity of the targeted destination, and tracking credits may eliminate the need for synchronous communication between the end points. Accordingly, the MMS may determine that a write is allowable when there are enough write credits available. In addition or alternatively, the MMS may determine that a good opportunity to write data from a cache exists (a) if cache controller 32 is free or idle and/or (b) if current conditions present an opportunity to optimize the power budget. For example, the MMS may determine that current conditions present an opportunity to optimize the power budget by coalescing write sizes of cache-line granularity into coarser page-line granularity of persistent memory. This coalescence could be done as a batching operation before the processor drops into a lower power state, for instance. Factors to be considered could include spatial locality, power state of persistent memory, and power state criteria of the current core and die. These factors could be used to minimize power state transitions. For instance, under some conditions the MMS may choose to do immediate write back, and in other conditions the MMS may choose to delay write back, to evenly distribute writes, so that processor can more often drop into a lower power state, or remain in a lower power state longer. In alternative embodiments, MMSs may use other approaches to control when determinations are to be made, and MMSs may consider other factors when determining whether a good opportunity exists.

As shown at block 522, if the MMS has detected a good opportunity, the MMS may then determine whether or not cache 34 contains any WB-E data that has not already been written to the WPB of the MMC. For purposes of this disclosure, WB-E data that has not already been written to the WPB of the MMC may be referred to as "pending WB-E cache data."

In one embodiment, the MMS automatically keeps track of the pending WB-E cache data by maintaining a WB-E wait queue to indicate pending eager write backs. And the MMS determines whether or not cache 34 contains pending WB-E cache data by looking into that queue or by considering an extended cache tag. In alternative embodiments, MMSs may use other approaches for tracking pending WB-E cache data and/or for determining whether pending WB-E cache data exists. For example, an MMS may extend the cache tag to indicate which cache lines are waiting for eager write back.

If cache 34 contains pending WB-E cache data, the MMS may automatically perform an eager write back, as shown at block 524. For instance, as shown in FIG. 4A, the MMS may use the CLWB operation or instruction to write the pending WB-E cache data to MMC 30. Arrows "WB_1" and "WB_2" show that the MMS is writing back the WB-E data from the first two store instructions to the MMC. And arrow "WB_3" shows that the MMS is writing back the WB-E data from the combined Store_3 and Store_4 instructions.

As indicated at block 530, the MMS may then determine whether the present state of processing device 20 presents a good opportunity to perform an eager write back to the persistent memory domain. (The MMS may also reach block 530 in response to a negative determination at block 520 or block 522.) For instance, the MMS may determine whether the resources needed to write data from the main memory controller to the persistent memory domain are available. In one embodiment, the MMS makes such a determination whenever there are enough write resources available to perform eager eviction from the MMS domain to the PM domain. The MMS may determine that a good opportunity exists if MMC 30 is idle and no writes are pending. MMC 30 may be considered to be idle if very few or no write resources are being used. The MMS may determine that no writes are pending if the write pending buffer is empty. In alternative embodiments, the MMS may use other approaches to control when determinations are to be made, and the MMS may consider other factors when determining whether a good opportunity exists.

As shown at block 532, if the MMS has detected a good opportunity, the MMS may then determine whether or not WPB 36 contains any WB-E data that has not already been written to persistent memory domain. For purposes of this disclosure, WB-E data that has not already been written to the persistent memory domain may be referred to as "pending WPB data." Furthermore, the term "pending WB-E data" encompasses both pending WB-E cache data and pending WPB data.

In one embodiment, the MMS automatically keeps track of the pending WPB data by maintaining a queue; a first in, first out (FIFO) stack; or any other suitable data structure. And the MMS determines whether or not cache 34 contains pending WPB data by checking that data structure. In alternative embodiments, MMSs may use other approaches tracking pending WPB data and for determining that pending WPB data exists. For example, the MMS may implement self-draining leaky bucket data structure which will autonomously evict the bucket depending on PM ability to accept any more writes.

If WPB 36 contains pending WPB data, the MMS may automatically perform an eager write back, as shown at block 534. Such a write back may also be referred to as an eviction or a flush. For instance, as shown in FIG. 4A, the MMS may write the pending WPB data to the PMC. Arrow "Persistent_Write_A" shows that the MMS is writing back the WB-E data from the first store instruction to the persistent memory domain.

The process may then pass through page connector A to block 540, which shows the MMS determining whether or not application 44 has executed a serializing instruction (e.g., SFENCE). If application 44 has not executed a serializing instruction, the MMS may determine whether application 44 has executed a commit instruction (e.g., CMTPM), as shown at block 550. If application 44 has not executed a commit instruction, the process may pass through page connector B back to block 510, with the MMS repeating the operations described above.

However, referring again to block 540, application 44 has executed a serializing instruction, the MMS may then determine whether there is any pending WB-E data from application 44 in cache 34, as shown at block 542. If the cache contains such data, the MMS may perform a write-back operation to write the pending data to MMC 30, as shown at block 544. As indicated by the arrow returning to block 542, the MMS may then check to see if there is any more pending WB-E data for application 44 in cache 34.

For instance, referring again to FIG. 4A, the "SFENCE" arrow leading from the Application column to the Core column illustrates a serializing instruction executed by application 44 after the MMS has already eagerly written all pending WP-E cache data to MMC 30. Accordingly, the short bent arrow that leads from the Core column back to the Core column illustrates that the SFENCE instruction needs to spend very little time, if any, waiting for dirty cache lines to be written back to MMC 30.

Referring again to FIG. 5B, when cache 34 contains no more pending WB-E data for application 44, the process may pass from block 542 to block 546, which shows the MMS determining whether a commit operation (e.g., CMTPM) is in process. For instance, as described in greater detail below, CMTPM may be in the process of flushing WPB 36. If a commit operation is in process, the serializing operation may wait until the commit operation has finished all of its work. For instance, as indicated at block 547, the MMS may determine whether WPB 36 is empty. And as depicted by block 548 and the arrow returning to block 547, the MMS may flush any data remaining in WPB 36 to the persistent memory domain. Once WPB 36 is empty, the CMTPM instruction may be considered complete, and the process may pass from block 547 to block 549. As shown at block 549, once the commit operation has completed all of its work, or if no commit was in process, the MMS may complete the serializing instruction. For example, referring again to FIG. 4A, the dashed line "SFENCE_done" illustrates completion of an SFENCE instruction when no CMTPM was in process.

However, referring again to block 550, if application 44 has executed a commit instruction, the MMS may automatically initiate the writing, flushing, or eviction of all pending WPB data, if any, to the persistent memory domain, as shown at block 552, and as described above with regard to blocks 546, 547, 548, and 549. However, in the embodiment of FIG. 5B, commit instructions are non-blocking. In other words, when an application executes a commit instruction, control may return to the application, allowing the application to proceed with additional instructions before the commit instruction has finished all of its work.

Consequently, as shown in FIG. 4B, application 44 may execute a commit instruction, followed by a serializing instruction which will wait for the commit instruction to finish all of its work. For instance, SFENCE may wait for the MMS to evict the WPB data from WB_2 and WB_3 to the persistent memory domain, as shown with the arrows "Persistent_Write_B" and "Persistent_Write_C," respectively. Thus, once the SFENCE in FIG. 4B is complete, as indicated by the dashed arrow "SFENCE_done," application 44 can be certain that the WB-E data has achieved durability by reaching the persistent memory domain.

The WB-E memory type in combination with instructions like SFENCE and CMTPM may be beneficial in an environment where memory is in or behind a remote node, in an environment that uses a system fabric interconnect, and in other environments or scenarios.

In one embodiment, the serialization instructions are local and the commit instructions are global. In other words, SFENCE provides for serialization of operations for the specific thread that executed the SFENCE, while CMTPM provides for eviction of all PM data for all threads from all memory controllers.

Figure 6:
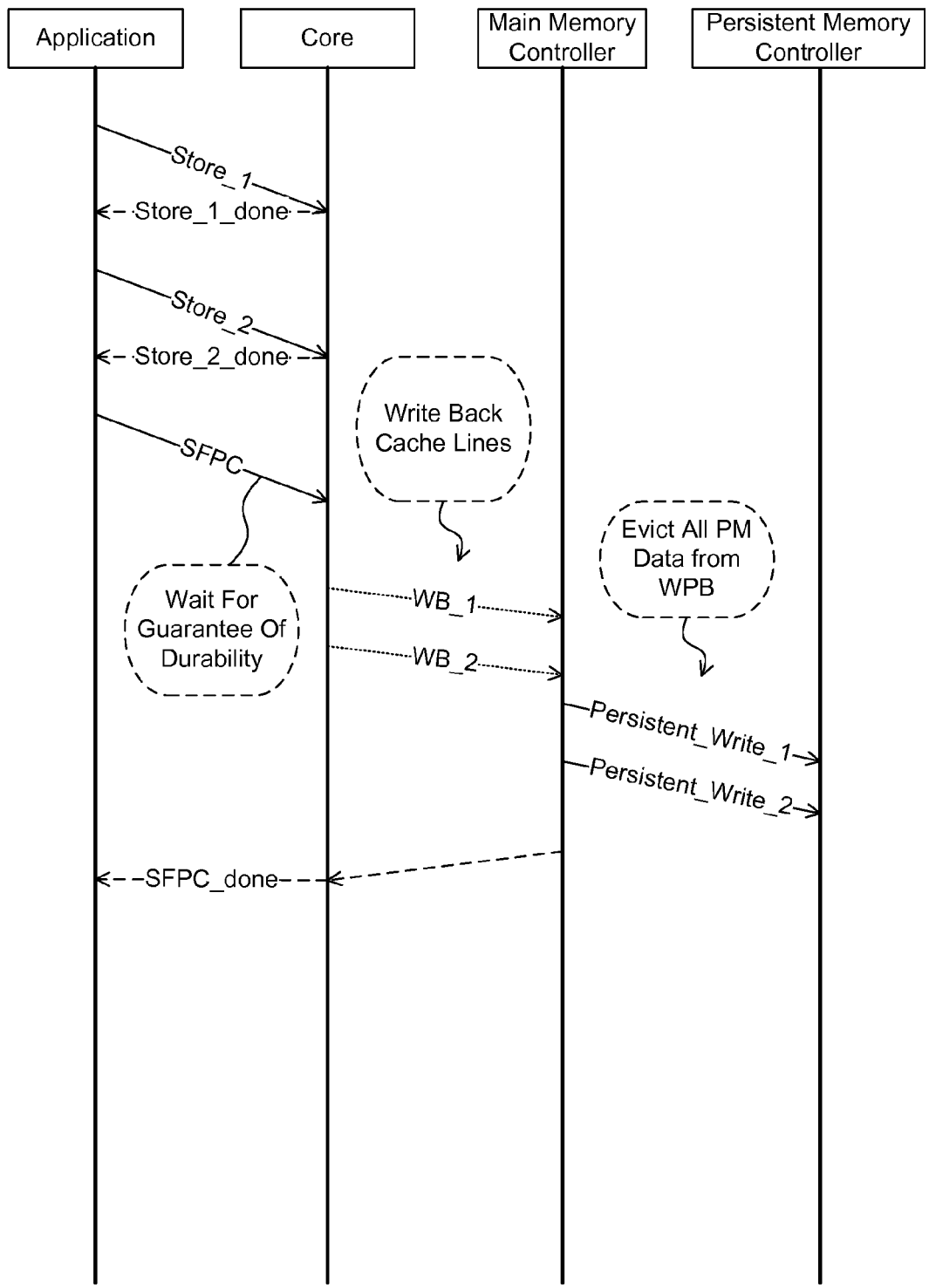
FIG. 6 is a sequence diagram depicting an alternative example sequence of operations for supporting persistent memory.

FIG. 6 is a sequence diagram depicting another example sequence of operations for supporting persistent memory. In the embodiment of FIG. 6, the platform supports WB-E memory, as described above. In addition, the platform (e.g., the processor microarchitecture) supports a new instruction that combines the serializing and commit operations described above with regard to FIG. 5B. This new instruction may be referred to as a "store fence with persistent commit" (SFPC) instruction. Instead of using a sequence of instructions like those described above with regard to FIGS. 4A and 4B, (e.g., SFENCE, followed by CMTPM, followed by another SFENCE), an application may use a single SFPC. For example, as shown in FIG. 6, if an application is processing a transaction that involves two writes or stores, the application may first execute those two stores, as depicted by arrows "Store_1" and "Store_2." To complete the transaction, the application may then execute SFPC. In the embodiment of FIG. 6, SFPC is a blocking instruction. Thus, the application will not regain control until the SFPC has finished all of its work. In this case, as shown by arrows "WB_1" and "WB-2," that work includes writing pending WB-E data from the cache to the MMC. And as shown by arrows "Persistent_Write_1" and "Persistent_Write_2," that work also includes evicting all pending WPB data from the WPB to the persistent memory domain. Once the MMS has written the WB-E data to the persistent memory domain, control returns to the application, as shown by arrow "SFPC_done." In addition, the MMS may support eager write back of pending cache data and pending WPB data, as described above.

In different embodiments, the SFPC instruction may target (a) one MMC, (b) a group of MMCs, or (c) all MMCs, based on an argument passed to the MMS by the application or the operating system to optimize the application performance. For example, an application in a processing device that is well partitioned for non-uniform memory access (NUMA) may enjoy significantly improved performance by taking advantage of the flexibility to target a specific MMC or a specific group of MMCs.

An advantage of one embodiment is that the disclosed technology makes it easier for software developers to write code that effectively handles in-place modification of PM data, random writes to PM, etc. By contrast, alternatives such as computer language extensions, compiler intrinsic functions, and compiler primitives may be much less robust. For example, a compiler intrinsic or primitive may be only suitable for block operation such as "memcpy."

Another advantage is that the present teachings may be used to simplify the software code necessary to handle logical transactions. For instance, when a processing device features the technology described above, an application may not need to "open" a transaction.

In light of the principles and example embodiments described and illustrated herein, it will be recognized that the illustrated embodiments can be modified in arrangement and detail without departing from such principles. For example, the technology described herein could be used to asynchronously mirror one or more memory ranges in a fabric environment. Such range mirroring could be particularly useful in a use case where a redundancy system replicates memory images in persistent memory, instead of using SAN solutions.

Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is an automated method for supporting persistent memory. A processing device provides a WB-E memory space for an application running on a processing unit of the processing device. The processing device comprises a memory management system and persistent memory in a persistent memory domain. The memory management system maps the WB-E memory space to the persistent memory. The processing device automatically stores WB-E data in a cache associated with the processing unit in response to creation of the WB-E data by the application. The application creates the WB-E data by executing an instruction to store data to an address in the WB-E memory space. In response to execution of a commit instruction by the application after the application has created WB-E data for multiple memory addresses, the processing device automatically ensures that all of the WB-E data for the application has been saved to the persistent memory domain. The operation of automatically ensuring that all of the WB-E data for the application has been saved to the persistent memory domain is performed by the memory management system.

Example A2 includes the features of Example A1, and in response to a pre-commit serializing instruction, if any of the WB-E data for the application has not already been written from the cache to a main memory controller in the processing device, the MMS writes said WB-E data from the cache to the main memory controller.

Example A3 includes the features of Example A1, and the operation of writing the WB-E data from the cache to the main memory controller is performed before the operation of automatically ensuring that all of the WB-E data for the application has been saved to the persistent memory domain. Also, the operation automatically ensuring that all of the WB-E data for the application has been saved to the persistent memory domain comprises writing all WB-E data for the application in the main memory controller from the main memory controller to the persistent memory domain. Example A3 may also include the features of Example A2.

Example A4 includes the features of Example A3, and in response to execution of a post-commit serializing instruction by the application, the processing device returns control to the application only after all of the WB-E data for the application has been saved to the persistent memory domain. Example A4 may also include the features of Example A2.

Example A5 includes the features of Example A1, and the processing device automatically determines whether resources needed to write data from the cache to a main memory controller are available. The processing device automatically determines whether the cache contains any WB-E data. In response to determinations that (a) resources needed to write data from the cache to the main memory controller are available and (b) the cache contains WB-E data, the processing device automatically writes at least some of the WB-E data from the cache to the main memory controller. Example A5 may also include (a) the features of Example A2, A3, or A4; (b) the features of Examples A2 and A3; or (c) the features Examples A2 and A4.

Example A6 includes the features of Example A5, and the processing device automatically determines whether resources needed to write data from the main memory controller to the persistent memory domain are available. The processing device also automatically determines whether the main memory controller contains any WB-E data. In response to determinations that (a) resources needed to write data from the main memory controller to the persistent memory domain are available and (b) the persistent memory domain contains WB-E data, the processing device automatically writes at least some of the WB-E data from the main memory controller to the persistent memory domain. Example A6 may also include (a) the features of Example A2, A3, or A4; (b) the features of Examples A2 and A3; or (c) the features of Examples A2 and A4.

Example A7 includes the features of Example A1, and the processing device automatically determines whether resources needed to write data from a main memory controller to the persistent memory domain are available. The processing device also automatically determines whether the main memory controller contains any WB-E data. In response to determinations that (a) resources needed to write data from the main memory controller to the persistent memory domain are available and (b) the persistent memory domain contains WB-E data, the processing device automatically writes at least some of the WB-E data from the main memory controller to the persistent memory domain. Example A7 may also include (a) the features of Example A2, A3, A4, A5, or A6; or (b) the features of any two or more of Examples A2 through A6.

Example A8 includes the features of Example A1, and a memory management system for the processing device automatically keeps track of the WB-E data that is in the cache. Example A8 may also include (a) the features of Example A2, A3, A4, A5, A6, or A7; or (b) the features of any two or more of Examples A2 through A7.

Example A9 includes the features of Example A1, and the processing device comprises a main memory controller and a memory management system. Also, the memory management system, automatically keeps track of the WB-E data that is in the main memory controller. Example A9 may also include (a) the features of Example A2, A3, A4, A5, A6, A7, or A8; (b) the features of any two or more of Examples A2 through A8.

Example A10 includes the features of Example A1, and the application runs at an application level on top of an operating system running at a system level. Also, the processing device supports the WB-E memory at the system level. Example A10 may also include (a) the features of Example A2, A3, A4, A5, A6, A7, A8, or A9; (b) the features of any two or more of Examples A2 through A9.

Example A11 includes the features of Example A10, and the operating system provides an application programming interface (API) that enables the application create a mapping to the WB-E memory space. Example A11 may also include (a) the features of Example A2, A3, A4, A5, A6, A7, A8, or A9; (b) the features of any two or more of Examples A2 through A9.

Example A12 includes the features of Example A1, and the application runs at an application level on top of an operating system running at a system level. The operating system runs on top of a platform operating at a platform level, wherein the platform includes hardware and firmware. The processing device supports the WB-E memory at the platform level. Example A12 may also include (a) the features of Example A2, A3, A4, A5, A6, A7, A8, A9, A10, or A11; (b) the features of any two or more of Examples A2 through A11.

Example A13 includes the features of Example A12, and the platform comprises the processing unit, the persistent memory, and a memory management system that provides for WB-E memory. Example A13 may also include (a) the features of Example A2, A3, A4, A5, A6, A7, A8, A9, A10, or A11; (b) the features of any two or more of Examples A2 through A11.

Example B is at least one machine accessible medium comprising computer instructions for supporting persistent memory. The computer instructions, in response to being executed on a data processing system, enable the data processing system to perform a method according to any one or more of Examples A1 through A13.

Example C is a data processing system that supports persistent memory. The data processing system comprises a processing element, at least one machine accessible medium responsive to the processing element, and computer instructions stored at least partially in the at least one machine accessible medium. Also, in response to being executed, the computer instructions enable the data processing system to perform a method according to any one or more of Examples A1 through A13.

Example D is a data processing system that supports persistent memory. The data processing system comprises means for performing the method of any one or more of Examples A1 through A13.

What is claimed is:

1. A data processing system with features to support persistent memory, the data processing system comprising:
   a processing element;
   at least one machine accessible medium responsive to the processing element, wherein the at least one machine accessible medium comprises persistent memory to operate within a persistent memory domain; and
   a memory management system to facilitate communications between the processing element and the persistent memory, wherein the memory management system is configured to enable the data processing system to perform operations comprising:
      providing an enhanced write-back (WB-E) memory space for an application running on the processing element;
      mapping the WB-E memory space to the persistent memory;
      in response to creation of WB-E data by the application, automatically storing the WB-E data in a cache associated with the processing element, wherein the application creates WB-E data by executing an instruction to store data to an address in the WB-E memory space; and
      in response to execution of a commit instruction by the application after the application has created WB-E data for multiple memory addresses, automatically ensuring that all of the WB-E data for the application has been saved to the persistent memory domain.

2. A data processing system according to claim 1, wherein:
   the data processing system comprises a main memory controller responsive to the processing element; and
   the operations further comprise, in response to a pre-commit serializing instruction, if any of the WB-E data for the application has not already been written from the cache to a main memory controller in the data processing system, writing said WB-E data from the cache to the main memory controller.

3. A data processing system according to claim 2, wherein:
   the operation of writing the WB-E data from the cache to the main memory controller is performed before the operation of automatically ensuring that all of the WB-E data for the application has been saved to the persistent memory domain; and
   the operation automatically ensuring that all of the WB-E data for the application has been saved to the persistent memory domain comprises writing all WB-E data for the application in the main memory controller from the main memory controller to the persistent memory domain.

4. A data processing system according to claim 3, wherein the operations further comprise:
   in response to execution of a post-commit serializing instruction by the application, returning control to the application only after all of the WB-E data for the application has been saved to the persistent memory domain.

5. A data processing system according to claim 1, wherein:
   the memory management system comprises a main memory controller responsive to the processing element; and
   the operations further comprise:
      automatically determining whether resources needed to write data from the cache to the main memory controller are available;
      automatically determining whether the cache contains any WB-E data; and
      in response to determinations that (a) resources needed to write data from the cache to the main memory controller are available and (b) the cache contains WB-E data, automatically writing at least some of the WB-E data from the cache to the main memory controller.

6. A data processing system according to claim 5, wherein the operations further comprise:
   automatically determining whether resources needed to write data from the main memory controller to the persistent memory domain are available;
   automatically determining whether the main memory controller contains any WB-E data; and
   in response to determinations that (a) resources needed to write data from the main memory controller to the persistent memory domain are available and (b) the persistent memory domain contains WB-E data, automatically writing at least some of the WB-E data from the main memory controller to the persistent memory domain.

7. A data processing system according to claim 1, wherein:
   the memory management system comprises a main memory controller responsive to the processing element; and
   the operations further comprise:
      automatically determining whether resources needed to write data from the main memory controller to the persistent memory domain are available;
      automatically determining whether the main memory controller contains any WB-E data; and
      in response to determinations that (a) resources needed to write data from the main memory controller to the persistent memory domain are available and (b) the persistent memory domain contains WB-E data, automatically writing at least some of the WB-E data from the main memory controller to the persistent memory domain.

8. A method for supporting persistent memory, the method comprising:
   providing an enhanced write-back (WB-E) memory space for an application running on a processing unit of a processing device, wherein the processing device comprises a memory management system and persistent memory in a persistent memory domain, and wherein the memory management system maps the WB-E memory space to the persistent memory;
   automatically storing WB-E data in a cache associated with the processing unit in response to creation of the WB-E data by the application, wherein the application creates the WB-E data by executing an instruction to store data to an address in the WB-E memory space; and
   in response to execution of a commit instruction by the application after the application has created WB-E data for multiple memory addresses, automatically ensuring that all of the WB-E data for the application has been saved to the persistent memory domain, wherein the operation of automatically ensuring that all of the WB-E data for the application has been saved to the persistent memory domain is performed by the memory management system.

9. A method according to claim 8, further comprising:
in response to a pre-commit serializing instruction, if any of the WB-E data for the application has not already been written from the cache to a main memory controller in the processing device, writing said WB-E data from the cache to the main memory controller.

10. A method according to claim 9, wherein:
the operation of writing the WB-E data from the cache to the main memory controller is performed before the operation of automatically ensuring that all of the WB-E data for the application has been saved to the persistent memory domain; and
the operation automatically ensuring that all of the WB-E data for the application has been saved to the persistent memory domain comprises writing all WB-E data for the application in the main memory controller from the main memory controller to the persistent memory domain.

11. A method according to claim 8, further comprising:
in response to execution of a post-commit serializing instruction by the application, returning control to the application only after all of the WB-E data for the application has been saved to the persistent memory domain.

12. A method according to claim 8, further comprising:
automatically determining whether resources needed to write data from the cache to a main memory controller are available;
automatically determining whether the cache contains any WB-E data; and
in response to determinations that (a) resources needed to write data from the cache to the main memory controller are available and (b) the cache contains WB-E data, automatically writing at least some of the WB-E data from the cache to the main memory controller.

13. A method according to claim 12, further comprising:
automatically determining whether resources needed to write data from the main memory controller to the persistent memory domain are available;
automatically determining whether the main memory controller contains any WB-E data; and
in response to determinations that (a) resources needed to write data from the main memory controller to the persistent memory domain are available and (b) the persistent memory domain contains WB-E data, automatically writing at least some of the WB-E data from the main memory controller to the persistent memory domain.

14. A method according to claim 8, further comprising:
automatically determining whether resources needed to write data from a main memory controller to the persistent memory domain are available;
automatically determining whether the main memory controller contains any WB-E data; and
in response to determinations that (a) resources needed to write data from the main memory controller to the persistent memory domain are available and (b) the persistent memory domain contains WB-E data, automatically writing at least some of the WB-E data from the main memory controller to the persistent memory domain.

15. A method according to claim 8, further comprising:
in a memory management system for the processing device, automatically keeping track of the WB-E data that is in the cache.

16. A method according to claim 8, wherein the processing device comprises a main memory controller and a memory management system, and the method further comprises:
in the memory management system, automatically keeping track of the WB-E data that is in the main memory controller.

17. A method according to claim 8, wherein:
the application runs at an application level on top of an operating system running at a system level; and
the processing device supports the WB-E memory at the system level.

18. A method according to claim 17, wherein the operating system provides an application programming interface (API) that enables the application to create a mapping to the WB-E memory space.

19. A method according to claim 8, wherein:
the application runs at an application level on top of an operating system running at a system level;
the operating system runs on top of a platform operating at a platform level, wherein the platform includes hardware and firmware; and
the processing device supports the WB-E memory at the platform level.

20. A method according to claim 19, wherein the platform comprises:
the processing unit;
the persistent memory; and
a memory management system that provides for WB-E memory.

21. At least one non-transitory machine accessible medium comprising computer instructions for supporting persistent memory, wherein the computer instructions, in response to being executed on a data processing system, enable the data processing system to perform operations comprising:
providing an enhanced write-back (WB-E) memory space for an application running on a processing unit of the data processing system, wherein the data processing system comprises a memory management system and persistent memory in a persistent memory domain, and wherein the memory management system maps the WB-E memory space to the persistent memory;
automatically storing WB-E data in a cache associated with the processing unit in response to creation of the WB-E data by the application, wherein the application creates the WB-E data by executing an instruction to store data to an address in the WB-E memory space; and
in response to execution of a commit instruction by the application after the application has created WB-E data for multiple memory addresses, automatically ensuring that all of the WB-E data for the application has been saved to the persistent memory domain, wherein the operation of automatically ensuring that all of the WB-E data for the application has been saved to the persistent memory domain is performed by the memory management system.

22. At least one machine accessible medium according to claim 21, wherein the operations further comprise:
in response to a pre-commit serializing instruction, if any of the WB-E data for the application has not already been written from the cache to a main memory controller in the data processing system, writing said WB-E data from the cache to the main memory controller.

23. At least one machine accessible medium according to claim 22, wherein:
the operation of writing the WB-E data from the cache to the main memory controller is performed before the operation of automatically ensuring that all of the WB-E data for the application has been saved to the persistent memory domain; and the operation automatically ensuring that all of the WB-E data for the application has been saved to the persistent memory domain comprises writing all WB-E data for the application in the main memory controller from the main memory controller to the persistent memory domain.

24. At least one machine accessible medium according to claim 23, wherein the operations further comprise:

in response to execution of a post-commit serializing instruction by the application, returning control to the application only after all of the WB-E data for the application has been saved to the persistent memory domain.

25. At least one machine accessible medium according to claim 21, wherein the operations further comprise:

automatically determining whether resources needed to write data from the cache to a main memory controller are available;

automatically determining whether the cache contains any WB-E data; and in response to determinations that (a) resources needed to write data from the cache to the main memory controller are available and (b) the cache contains WB-E data, automatically writing at least some of the WB-E data from the cache to the main memory controller.

26. At least one machine accessible medium according to claim 25, wherein the operations further comprise:

automatically determining whether resources needed to write data from the main memory controller to the persistent memory domain are available;

automatically determining whether the main memory controller contains any WB-E data; and in response to determinations that (a) resources needed to write data from the main memory controller to the persistent memory domain are available and (b) the persistent memory domain contains WB-E data, automatically writing at least some of the WB-E data from the main memory controller to the persistent memory domain.

27. At least one machine accessible medium according to claim 21, wherein the operations further comprise:

automatically determining whether resources needed to write data from a main memory controller to the persistent memory domain are available;

automatically determining whether the main memory controller contains any WB-E data; and in response to determinations that (a) resources needed to write data from the main memory controller to the persistent memory domain are available and (b) the persistent memory domain contains WB-E data, automatically writing at least some of the WB-E data from the main memory controller to the persistent memory domain.

* * * * *